United States Patent [19]

Botte

[11] Patent Number: 5,637,204
[45] Date of Patent: Jun. 10, 1997

[54] END CASING FOR AN ELECTRODIALYZER ELECTRODIALYZER EQUIPPED WITH SUCH A CASING AND USE OF THE SAID ELECTRODIALYZER

[75] Inventor: L. Botte, Rosignano-Solvay, Italy

[73] Assignee: Solvay, Brussels, Belgium

[21] Appl. No.: 594,181

[22] Filed: Jan. 31, 1996

[30] Foreign Application Priority Data

Jan. 3, 1995 [IT] Italy ................... MI95A0185

[51] Int. Cl.$^6$ .............. B01D 61/46; B01D 61/50; C25B 11/03; C25C 7/02
[52] U.S. Cl. ................ 204/627; 204/284; 204/286
[58] Field of Search .................. 204/627, 628, 204/630, 631, 632, 633, 634, 635, 636, 637, 638, 639, 518, 519, 520, 521, 522, 523, 524, 525, 526, 527, 528, 529, 530, 531, 532, 533, 534, 535, 536, 537, 538, 539, 540, 541, 542, 543, 544, 545, 286, 284

[56] References Cited

U.S. PATENT DOCUMENTS

| | | | |
|---|---|---|---|
| 4,233,146 | 11/1980 | Rothmayer et al. | 204/255 |
| 4,425,214 | 1/1984 | Pellegri | 204/254 |
| 4,561,959 | 12/1985 | Pimlott | 204/253 |
| 4,592,822 | 6/1986 | de Nora | 204/252 |
| 4,737,260 | 4/1988 | Strathmann et al. | 204/636 |
| 4,767,519 | 8/1988 | de Nora | 204/255 |
| 4,923,583 | 5/1990 | Woodard, Jr., et al. | 204/286 |
| 5,130,008 | 7/1992 | Cabaraux et al. | 204/283 |
| 5,221,452 | 6/1993 | Nakao et al. | 204/258 |

FOREIGN PATENT DOCUMENTS

| | | |
|---|---|---|
| 0031897 | 7/1981 | European Pat. Off. . |
| 0081092 | 6/1983 | European Pat. Off. . |
| 0172495 | 2/1986 | European Pat. Off. . |
| 986196 | 7/1951 | France . |
| 1382379 | 11/1964 | France . |
| 663316 | 12/1951 | United Kingdom . |
| 1051659 | 12/1966 | United Kingdom . |

OTHER PUBLICATIONS

Andre Bonnin: "Electrodialyse" In: Techniques de l'ingenieur [Engineering techniques], Mar. 1988, pp. J2840-1 and J2840-13.

Primary Examiner—Kathryn L. Gorgos
Assistant Examiner—John S. Starsiak, Jr.
Attorney, Agent, or Firm—Spencer & Frank

[57] ABSTRACT

End casing for an electrodialyzer, comprising a vertical panel (8) and a vertical frame (9) which define between them a cavity containing an electrode, the said electrode comprising a perforated vertical metal plate (12) which is arranged in the cavity, facing the panel and set back therefrom, so as to form a chamber (21) between the panel, the plate and the frame, the said chamber being divided into vertical channels (27, 28) by vertical partitions (29) and being in communication with an inlet conduit (23, 26) and a discharge conduit (22, 24) for electrolytes. Electrodialyzer comprising an alternating succession of selectively ion-permeable membranes (1, 1', 25, 25') and vertical frames (2) between two end casings (3, 3') as defined above.

7 Claims, 2 Drawing Sheets

END CASING FOR AN ELECTRODIALYZER ELECTRODIALYZER EQUIPPED WITH SUCH A CASING AND USE OF THE SAID ELECTRODIALYZER

FIELD OF THE INVENTION

The invention relates to electrodialysers.

It more particularly relates to casings arranged at the ends of electrodialysers.

TECHNOLOGY REVIEW

Electrodialysers are electrochemical installations formed by a stack of selectively ion-permeable membranes and frames, between two end casings containing electrodes. The end casings generally comprise a vertical panel supporting an electrode and forming, with a peripheral frame, a cavity intended to contain an electrolyte. The schematic representation of an electrodialyser is found in Techniques de l'ingénieur [Engineering techniques] 3-1988, page J 2840-13, FIG. 18. During operation of the electrodialyser, the electrodes are connected to the terminals of a DC source and the electrolytes are introduced into the compartments defined between the membranes and the frames, as well as into the end casings, so as to give rise to electrochemical reactions within the electrolytes.

The electrochemical reactions which take place in the end casings generally produce a gas on the electrodes, for example oxygen and hydrogen in the case of aqueous electrolytes. It is important to ensure regular discharge of these gases, and this is usually obtained by circulating the electrolyte in a loop between the end casing and a degassing chamber (EP-A-0,081,092, page 8, lines 11 to 16).

The effect of the formation of gas in the end casings of electrodialysers is to generate in the latter a pressure which, all other things being equal, increases as the electric current density in the electrodialyser increases. It thereby limits the productivity of industrial electrodialysers.

SUMMARY OF THE INVENTION

The object of the invention is to provide an end casing which allows high current densities in electrodialysers, but without this resulting in excessive pressures.

DETAILED DESCRIPTION OF THE INVENTION

Figure 1:
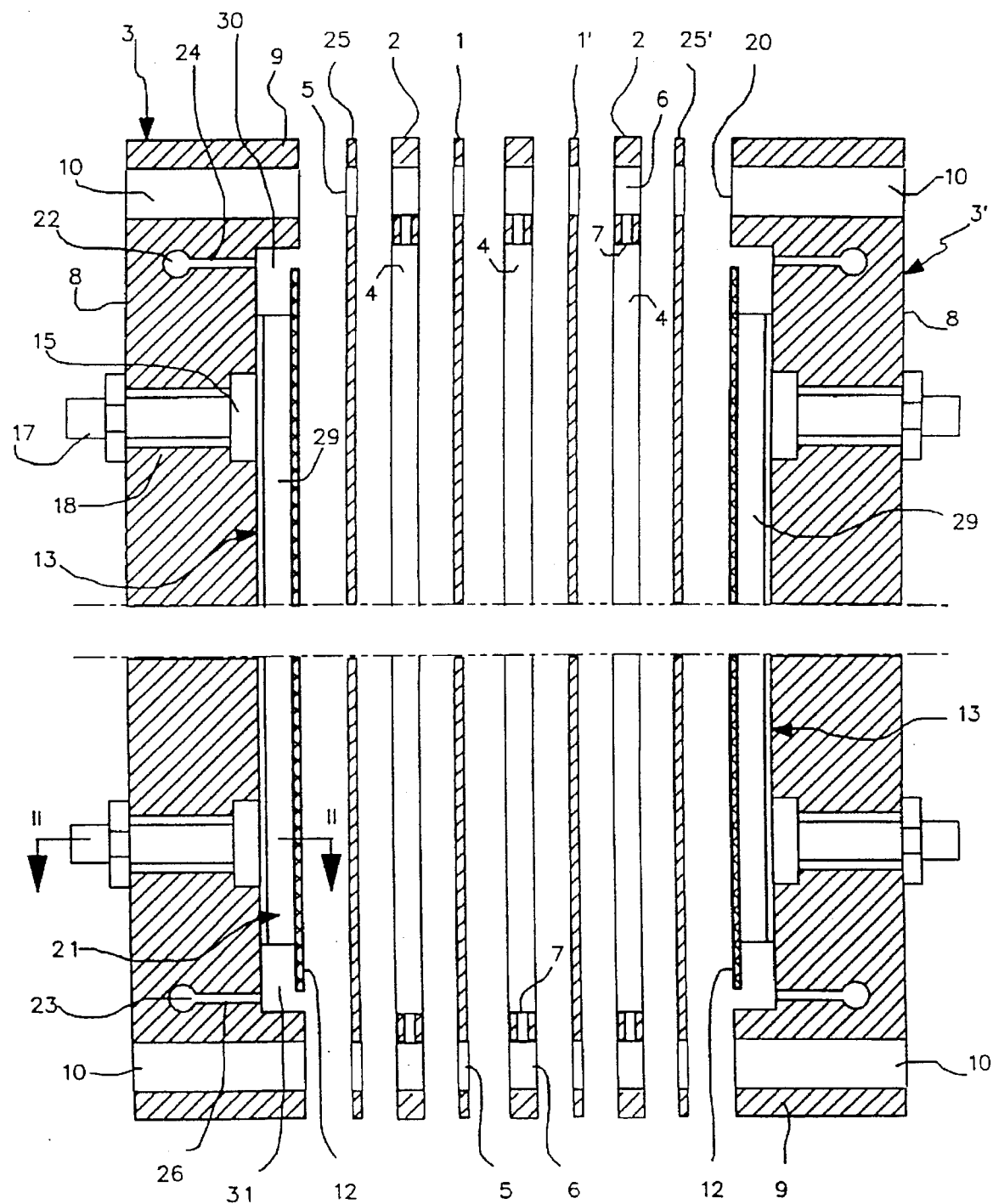
FIG. 1 is an exploded view, in vertical longitudinal section, of an embodiment of the electrodialyser according to the invention.

The invention therefore relates to an end casing for an electrodialyser, comprising a vertical panel and a vertical frame which define between them a cavity that contains an electrode and is in communication with an inlet conduit and a discharge conduit for electrolyte; according to the invention, the casing is characterized in that the electrode comprises a perforated vertical metal plate which is arranged in the cavity, facing the panel and set back therefrom so as to form a chamber between the panel, plate and the frame, in that the aforementioned chamber is divided into vertical channels by vertical partitions, and in that the aforementioned conduits open into the said chamber.

In the casing according to the invention, the panel is arranged vertically and is intended to serve as the end-plate of the electrodialyser.

The panel and the frame should be made of materials which withstand the chemical and electrochemical environment during operation of the electrodialyser. The frame may form an integral part of the panel or may be a separate element therefrom. If the frame is a separate element from the panel, the junction between the panel and the frame should be leaktight with respect to the electrolytes and gases. The frame and the panel are preferably made of a material which is not a conductor of electricity.

The perforated electrode plate may be a metal sheet pierced with openings, an openwork plate, a metal lattice or a sheet of expanded metal. A sheet of expanded metal is advantageously used.

The electrode plate is arranged in the aforementioned cavity of the casing, parallel to the panel and is set back therefrom. A chamber is thus formed between the panel and the plate. This chamber is divided into vertical channels by vertical partitions joining the panel of the casing to the electrode plate. There are at least two partitions, so as to produce at least three vertical channels in the chamber. In practice, the chamber may be divided into a larger number of vertical channels. The vertical partitions extend only over a part of the height of the chamber, so that the lower region and the upper region of the chamber are not partitioned. According to the invention, the lower region and the upper region of the chamber occupy less than one third, preferably 5 to 20%, of the total height of the chamber. Electrolyte inlet and discharge conduits respectively open into the two aforementioned regions of the chamber. This chamber is thus intended to be used as an electrolysis chamber when the casing is used in an electrodialyser. The thickness of the chamber and the width of the vertical channels should be chosen in such a way as to produce optimum hydrodynamic conditions therein during normal operation of the electrodialyser. The optimum values of these dimensions will therefore depend on various parameters, in particular the viscosity of the electrolyte circulating in the said chamber and the dimensions of the electrode plate. They can be determined easily in each particular case. In practice, the thickness of the chamber is advantageously greater than 1 mm, preferably at least equal to 5 mm. The volume of electrolyte to be employed is conditional on the thickness of the chamber and, for this purpose, it is recommended for its thickness not to exceed 100 mm, preferably 50 mm. Thicknesses of 10 to 30 mm are generally suitable.

If the electrode plate is an open work plate, the orientation of the horizontal slats must be designed in such a way that a rising fluid stream flowing along the plate outside the abovementioned chamber is deflected by these slats, passes through the openings in the electrode plate and enters the chamber.

In the casing according to the invention, the frame and the electrode plate may have a circular or polygonal profile. It is preferable to provide them with a rectangular profile.

In the casing according to the invention, the partitions may be made of metal or of a material which is not a conductor of electricity. If they are made of an electrically conductive material, it may prove to be recommendable to select this material from those having an overpotential greater than that of the material of the electrode plate. In this alternative embodiment of the invention, the overpotential taken into consideration is that relating to the electrolysis reaction producing a gas on the electrode plate during normal use of the casing in an electrodialyser.

In the casing according to the invention, the use of a subdivided electrolysis chamber has the beneficial result of improving the uniformity of the electrolyte flow and of facilitating discharge of the gas generated on the electrode plate.

In an advantageous embodiment of the casing according to the invention, the electrode face furthest away from the panel is substantially aligned with the frame. In this embodiment of the invention, the electrode plate is intended to act as a support for a membrane when the casing is mounted in an electrodialyser.

In another embodiment of the casing according to the invention, the aforementioned partitions act as distributors of the electrolysis electric current on the electrode plate. For this purpose, they are made of metal and fixed, on the one hand, to the electrode plate, and on the other hand, to electric current conductors which pass through the panel of the casing, the said panel being made of a material which does not conduct electricity.

The electrode and the partitions may be supported in the chamber of the casing by any suitable means. According to an advantageous embodiment of the invention, this means comprises a horizontal beam which is fixed transversely to the partitions and which is fitted into a corresponding housing in the panel of the casing. In a beneficial variant of this embodiment of the invention, the beam is made of metal and fixed to an electrical conductor passing through the panel of the casing to be connected to a current source.

In an additional embodiment of the casing according to the invention, at least some of the aforementioned partitions consist of the lateral flanges of U-shaped or V-shaped sections which are fixed to the electrode plate along their central part. This variant of the invention thus has the particular feature that the aforementioned vertical channels are alternately in communication with the electrode plate and isolated therefrom. All other things being equal, this variant of the invention optimizes the circulation of the gas and electrolyte in the chamber, by producing therein an alternating succession of ascending flows of an emulsion of gas in the electrolyte and descending flows of degassed electrolyte. This internal circulation in the chamber is favourable for discharging the gas produced at the electrode and, consequently, makes the chemical and electrochemical conditions in the casing uniform and reduces the pressure therein.

The invention also relates to an electrodialyser comprising, between two end casings according to the invention, an alternating succession of selectively ion-permeable membranes and vertical frames.

In the electrodialyser according to the invention, the ion-exchange membranes may comprise selectively cation-permeable membranes, selectively anion-permeable membranes and/or bipolar membranes.

In the electrodialyser according to the invention, the ion-exchange membranes and the frames which are interposed between them define electrodialysis compartments which are in communication with inlet conduits and discharge conduits for electrolytes. The number of compartments is not critical and may generally be as high as several hundred.

In a particular embodiment of the invention, the electrodialyser comprises a selectively ion-permeable (preferably cation-permeable) membrane on the electrode plate of each casing.

The electrodialyser according to the invention has various applications which are well known in the techniques of electrodialysis. It has an especially advantageous use for the manufacture of aqueous solutions of sodium hydroxide starting from aqueous solutions of sodium salts such as sodium chloride, sodium carbonate, sodium phosphate or sodium sulphate.

The invention therefore relates to the use of the electrodialyser according to the invention, defined above, for the electrodialysis of aqueous solutions of sodium chloride.

Particular features and details of the invention will emerge from the following description of the appended drawings.

FIG. 1 is an exploded view, in vertical longitudinal section, of one embodiment of the electrodialyser according to the invention.

Figure 2:
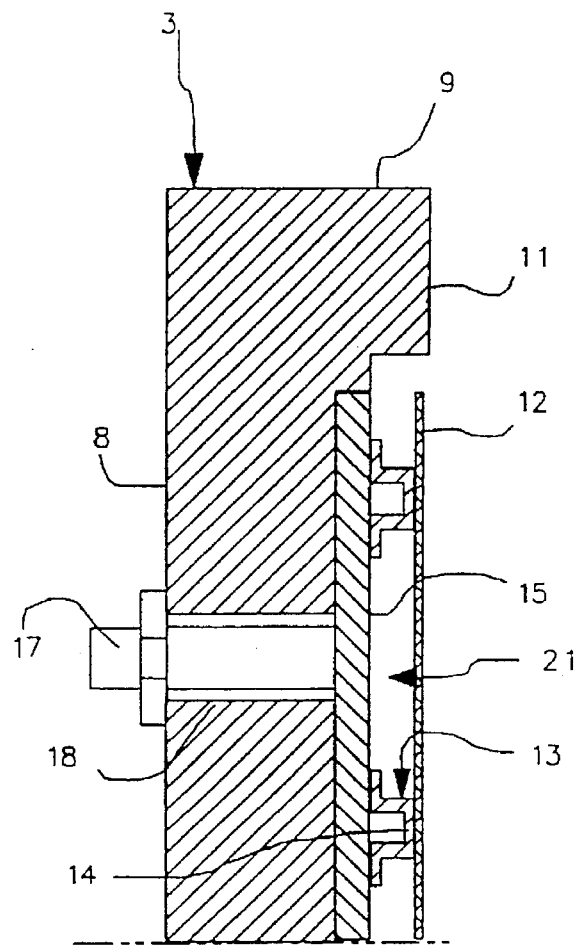
FIG. 2 shows a detail of the electrodialyser according to the invention in FIG. 1, in section on the plane II—II of FIG. 1.
Figure 2:
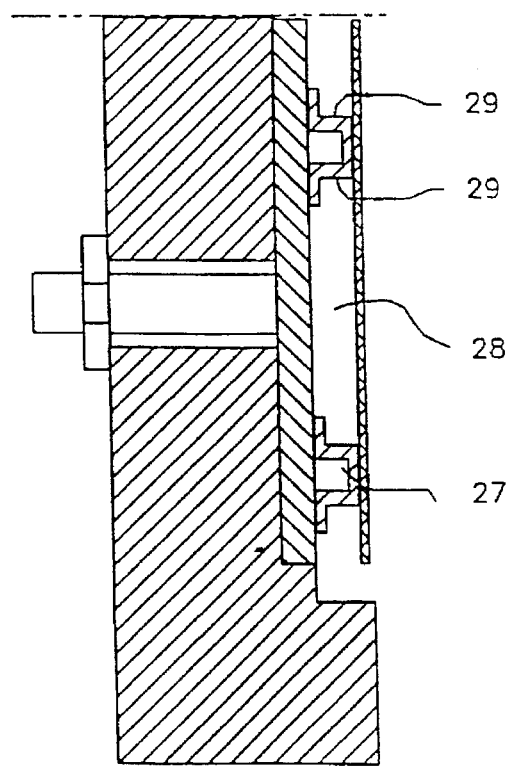

FIG. 2 shows a detail of the electrodialyser in FIG. 1, in section on the plane II—II of FIG. 1.

In these figures, the same reference notation denotes identical elements.

The electrodialyser represented in FIG. 1 comprises, in a manner which is known per se, selectively ion-permeable membranes 1 and 1', arranged vertically and alternating with vertical separators 2, between two end casings 3 and 3'. Selectively cation-permeable membranes 25 and 25' separate each end casing 3, 3' from a separator 2.

The function of the separators 2 is to delimit electrodialysis compartments 4 between the membranes 1, 1', 25 and 25'. They may, for example, be of the type described in Patents U.S. Pat. No. 4,233,146 and U.S. Pat. No. 4,737,260.

In their upper and lower parts, the membranes 1, 1', 25 and 25' and the separators 2 are pierced with openings 5 and 6 forming straight conduits for the circulation of electrolytes intended to feed the electrodialysis compartments 4. Tubes 7 pierced in the separators 2 provide communication between these conduits and the electrodialysis compartments 4.

The membranes 1, 1', 25 and 25' and the separators 2 are stacked and compressed between the two end casings 3 and 3' by means of connecting rods (not shown).

According to the invention, the end casings 3 and 3' comprise a vertical panel 8 having a projecting peripheral rim 9. The rim 9 thereby forms a frame at the periphery of the panel. This frame 9 is pierced with openings 10 in extension of the openings 5 and 6. These openings 10 are intended to be connected to electrolyte collectors for feeding the electrodialysis compartments 4.

The vertical panel 8 and the peripheral frame 9 define a vertical cavity in which an electrode is housed. This electrode comprises a perforated vertical metal plate 12 arranged facing the panel 8 and separated therefrom so as to delimit a chamber 21 with the panel 8 and the peripheral rim 9 of the latter. The plate 8 is advantageously located in alignment with the free face 20 of the frame 9. In this way, the electrode plate 12 acts as a support for the selectively permeable membrane 25 (25') in the electrodialyser.

On its face oriented towards the panel 8, the plate 12 supports vertical metal sections 13, uniformly distributed over the width of the plate 12. The sections 13 are each formed by a vertical strip folded into a U-shape, so as to have the shape of a gutter. They are welded to the plate 12 along the axial central part 14 of the U, and their lateral flanges 29 bear against the panel 8, so that the chamber 21 is divided into a series of vertical channels 27 and 28. The electrode plate 12 and its sections 13 are supported in the casing 3, (3') by means of horizontal beams 15 which are welded to the partitions 29 and which are fitted into corresponding housings in the panel 8. The beams 15 are welded transversely to metal bars 17 passing through orifices 18 pierced in the panel 8. The bars 17 are intended to be connected to a DC source in order to operate the electrodialyser.

The sections 13 extend only over a part of the height of the electrode plate 12, so that the upper 30 and lower 31 regions of the chamber 21 are not partitioned.

Conduits 22 and 23 pierced in the panel 8 communicate respectively with the unpartitioned parts 30 and 31 of the chamber 21 via ducts 24 and 26. They are intended to produce electrolyte circulation in the chamber 21.

The operation of the electrodialyser which has just been described with reference to FIGS. 1 and 2 will be explained with regard to use for the electrodialysis of an aqueous solution of sodium chloride. In this application, the membrane i is a selectively cation-permeable membrane and the membrane 1' is a bipolar membrane. The latter is arranged in the electrodialyser in such a way that its selectively anion-permeable face is directed towards the selectively cation-permeable membrane 1. The electrode plates 12 and the U-shaped sections 13 are, for example, made of nickel.

During operation of the electrodialyser, the bars 17 of the casing 3 are connected to the positive terminal of a DC source, and the bars 17 of the casing 3' are connected to the negative terminal of the current source. Water is introduced into the compartment 4, between the bipolar membrane 1' and the cation membrane 1, and an aqueous solution of sodium chloride is introduced into the compartment 4, between the bipolar membrane 1' and the cation membrane 25', and into the compartment 4 between the cation membranes 1 and 25. Water or a dilute aqueous solution of sodium hydroxide is furthermore introduced into the electrolysis chambers 21 of the end casings 3 and 3', via the conduits 23 and the tubes 26 of these casings. Under the effect of the electric current, the water undergoes electrolysis on the electric plates 12, in the channels 28 with the formation of oxygen in the casing 3 and of hydrogen in the casing 3'. An internal electrolyte circulation, comprising ascending flows of an aqueous emulsion in the channels 28 and descending flows of degassed electrolyte in the channels 27, is set up in the chambers 21 of the casings 3 and 3'. The gas separated from the electrolyte in the upper part of the chambers 21 is discharged from them through the conduits 22 via the tubes 24.

What is claimed is:

1. An end casing for an electrodialyser, comprising a vertical panel (8) and a vertical frame (9) which define between them a cavity that contains an electrode and is in communication with an inlet conduit (23, 26) and a discharge conduit (22, 24) for electrolyte, the electrode comprising a perforated vertical metal electrode plate (12) which is arranged in the cavity, facing the panel (8) and set back therefrom so as to form a chamber (21) between the panel (8), the perforated vertical metal electrode plate (12) and the frame (9), said chamber (21) divided into vertical channels (27, 28) by vertical partitions (29) made of metal and fixed, on the one hand, to the perforated vertical metal electrode plate (12) and, on the other hand, to electrical supply conductors passing through the panel (8) of the casing, and said conduits (22, 23, 24, 26) opening into said chamber (21).

2. An end casing for an electrodialyser, comprising a vertical panel (8) and a vertical frame (9) which define between them a cavity that contains an electrode and is in communication with an inlet conduit (23, 26) and a discharge conduit (22, 24) for electrolyte, the electrode comprising a perforated vertical metal electrode plate (12) which is arranged in the cavity, facing the panel (8) and set back therefrom so as to form a chamber (21) between the panel (8), the perforated vertical metal electrode plate (12) and the frame (9), said chamber (21) divided into vertical channels (27, 28) by vertical partitions (29) fixed, on the one hand, to the perforated vertical metal electrode plate (12) and, on the other hand, to at least one horizontal beam (15) which is fixed transversely to the partitions (29) and which is fitted into a corresponding housing in the panel (8) of the casing, and said conduits (22, 23, 24, 26) opening into the said chamber (21).

3. The casing according to claim 2, wherein the partitions (29) and the beam (15) are made of metal, and in that the bean (15) is fixed to at least one metal bar (17) passing through the panel (8) and used as an electrical supply conductor.

4. The casing according to claim 2, wherein at least some of the said partitions (29) consist of the lateral flanges (29) of U-shaped or V-shaped sections (13) which are fixed to the perforated vertical metal electrode plate (12) along their central part (14).

5. An electrodialyser, comprising an alternating succession of selectivity ion-permeable vertical membranes (1, 1') and vertical frames (2), between two end casings (3, 3'), each of said casings comprising a vertical panel (8) and a vertical frame (9) which define between them a cavity that contains an electrode and is in communication with an inlet conduit (23, 26) and a discharge conduit (22, 24) for electrolyte, the electrode comprising a perforated vertical metal electrode plate (12) which is arranged in the cavity, facing the panel (8) and set back therefrom so as to form a chamber (21) between the panel (8), the perforated vertical metal electrode plate (12) and the frame (9), said chamber (21) divided into vertical channels (27, 28) by vertical partitions (29), made of metal, and fixed on the one hand, to the the perforated vertical metal electrode plate (12), and on the other hand, to electrical supply conductors of the casing, and said conduits (22, 23, 24, 26) opening into the said chamber (21).

6. The electrodialyser according to claim 5, further comprising a selectively ion-permeable membrane (25, 25') on the perforated vertical metal electrode plate (12) of each casing (3, 3').

7. The electrodialyser according to claim 6, wherein the selectively ion-permeable membrane (25, 25') located on the perforated vertical metal electrode plate (12) of each casing (3, 3') is a selectively cation-permeable membrane.

* * * * *